United States Patent
Schuberth

(10) Patent No.: US 11,777,941 B2
(45) Date of Patent: *Oct. 3, 2023

(54) METHODS AND AUTHENTICATION SERVER FOR AUTHENTICATION OF USERS REQUESTING ACCESS TO A RESTRICTED DATA RESOURCE USING AUTHORIZED APPROVERS

(71) Applicant: Mideye AB, Stockholm (SE)

(72) Inventor: Ulf Schuberth, Sollentuna (SE)

(73) Assignee: Mideye AB, Stockholm (SE)

( * ) Notice: Subject to any disclaimer, the term of this patent is extended or adjusted under 35 U.S.C. 154(b) by 246 days.

This patent is subject to a terminal disclaimer.

(21) Appl. No.: 17/037,862

(22) Filed: Sep. 30, 2020

(65) Prior Publication Data

US 2022/0103563 A1  Mar. 31, 2022

(51) Int. Cl.
*H04L 29/00* (2006.01)
*H04L 9/40* (2022.01)

(52) U.S. Cl.
CPC .......... *H04L 63/102* (2013.01); *H04L 63/083* (2013.01)

(58) Field of Classification Search
CPC . H04L 63/102; H04L 63/083; H04L 63/0853; H04L 63/0892; H04L 63/10; H04L 63/0272
See application file for complete search history.

(56) References Cited

U.S. PATENT DOCUMENTS

| | | | | |
|---|---|---|---|---|
| 8,627,424 B1 * | 1/2014 | O'Malley | ........... | H04L 63/0838 370/254 |
| 8,639,628 B2 * | 1/2014 | Popp | ..................... | H04L 9/0863 705/67 |
| 8,949,953 B1 * | 2/2015 | Khitrenovich | .......... | H04L 63/08 726/4 |
| 9,032,490 B1 * | 5/2015 | Khitrenovich | .......... | G06F 21/35 713/186 |
| 9,172,698 B1 * | 10/2015 | Evans | ................. | H04L 63/0853 |

(Continued)

FOREIGN PATENT DOCUMENTS

WO  WO-2005083610 A1 *  9/2005  .........  H04L 63/0838

OTHER PUBLICATIONS

Rigney et al., "Remote Authentication Dial In User Service (RADIUS)", Internet Engineering Task Force (IETF) Network Working Group, Request for Comments (RFC) 2865, Jun. 2000.

*Primary Examiner* — Don G Zhao

(74) *Attorney, Agent, or Firm* — TUCKER ELLIS LLP

(57) ABSTRACT

Disclosed is a method performed by an authentication server for authentication of users requesting access to a restricted data resource from a communication device, the authentication server being situated in the restricted data resource. After checking that a username and password received from a communication device matches a stored username and password, the authentication server sends, using the RADIUS protocol, a request to the communication device to enter an approver ID. After receiving an approver ID from the communication device in response to the request, via the RADIUS protocol, the authentication server sends an approval request including user ID to an approver device indicated by the approver ID, and if the approver approves the request, the authentication server receives an accept to the approval request and grants the user access to the restricted data resource.

18 Claims, 5 Drawing Sheets

(56) References Cited

U.S. PATENT DOCUMENTS

| | | | |
|---|---|---|---|
| 9,419,968 B1* | 8/2016 | Pei | G06F 21/31 |
| 10,616,196 B1* | 4/2020 | Khitrenovich | G06N 20/00 |
| 2005/0102529 A1* | 5/2005 | Buddhikot | H04L 69/161 |
| | | | 713/153 |
| 2007/0043676 A1* | 2/2007 | Gao | H04M 17/00 |
| | | | 705/52 |
| 2008/0072303 A1* | 3/2008 | Syed | H04L 63/0807 |
| | | | 726/10 |
| 2008/0076386 A1* | 3/2008 | Khetawat | H04M 3/16 |
| | | | 455/410 |
| 2009/0193264 A1* | 7/2009 | Fedronic | G06Q 20/40975 |
| | | | 713/184 |
| 2010/0309878 A1* | 12/2010 | Stolyar | H04L 67/142 |
| | | | 370/331 |
| 2014/0123231 A1* | 5/2014 | Low | H04L 63/0892 |
| | | | 726/4 |
| 2015/0007280 A1* | 1/2015 | Carlson | H04W 12/068 |
| | | | 726/5 |
| 2016/0094546 A1* | 3/2016 | Innes | H04L 63/0815 |
| | | | 713/156 |
| 2017/0220815 A1* | 8/2017 | Ansari | G06Q 20/02 |
| 2018/0007059 A1* | 1/2018 | Innes | G06F 21/6218 |
| 2019/0245848 A1* | 8/2019 | Divoux | H04L 63/0815 |

\* cited by examiner

METHODS AND AUTHENTICATION SERVER FOR AUTHENTICATION OF USERS REQUESTING ACCESS TO A RESTRICTED DATA RESOURCE USING AUTHORIZED APPROVERS

BACKGROUND

The present disclosure relates generally to methods and authentication servers for authentication of users requesting access to a restricted data resource. The present disclosure further relates to computer programs corresponding to the above methods and authentication servers.

A restricted data resource aka an electronically restricted resource is defined as a data resource to which access is restricted. In other words, only authorized users are allowed to access data in the restricted data resource. Such a user has registered a user account for the restricted data resource. An example of such a restricted data resource is a virtual private network (VP N).

To prevent unauthorized access to restricted data resources such as VPNs, there are different procedures for authenticating users trying to access the VPN from a communication device. The authentication is performed by an authentication server that may be situated within the VPN. Typically, such a procedure comprises the user entering a username and password in its communication device. The communication device then sends the username and password to the authentication server that verifies the username and password entered by the user against data stored in a user repository. The user may then be allowed access to the VPN.

In some cases, in order to achieve a stronger and thereby more secure authentication, an additional authentication procedure after the verification of username and password may need to be performed in order for the user to get access to the VPN. Such additional authentication procedure can comprise requesting from the user a second password, e.g. a One Time Password (OTP) in addition to the firstly entered static password. This OTP can be sent to an authentication device of the user, e.g. the user's mobile phone, or obtained by an authentication device of the user, such as a token card that is provided to the user. Typically, the OTP is requested by the authentication server from the user in a challenge-response dialog, e.g. using a networking communication protocol called Remote Authentication Dial-In User Services (RADIUS). The RADIUS protocol is described in "Remote Authentication Dial In User Service (RADIUS)", by Rigney et al, Internet Engineering Task Force (IETF) Network Working Group, Request for Comments (RFC) 2865, published June 2000. When using RADIUS, the authentication server communicates with units and devices outside the restricted data resource via an access server. The authentication server then acts as a RADIUS server and the access server acts as a RADIUS client.

Another such additional authentication procedure may be to let an authorized approver accept, or deny, the user access to the VPN, after the username and password have been verified. The approver is then a different person than the user requesting access to the VPN. The approver is a person authorized to accept or deny access to the VPN. In this additional authentication procedure, an identification (ID) of the approver is preregistered for the user account, in the following called approver ID. In response to verifying the username and password, the authentication server then sends a request to a communication device registered with the approver ID, whether the approver wants to approve access to the VPN for the user of the communication device. The communication device of the approver is hereinafter called approver device. If so, the approver responds to the authentication server via the approver device, by acknowledging the request, and the authentication server grants the user access to the VPN. Typically, the request to the approver device and the approver response are sent from and received to the authentication server in a challenge-response dialog of the RADIUS protocol.

A problem with such an additional authentication procedure is however that it relies on one pre-registered approver who has to be involved in every log-in. When the approver is not present and active, the user has to wait. An alternative would be to have many pre-registered approvers that can handle the additional authentication procedure. However, then the request sent from the authentication server would be sent to all registered approvers. As a result, the security would be lowered. Further on, the more registered approvers for an account, the lower security level.

Consequently, there is a need for an improved additional authentication procedure. In other words, there is a need for a different procedure for achieving strong authentication when accessing restricted data resources such as VPNs for a user account. Such a procedure needs to be secure at the same time as it is easy to use for the user of the user account. Further, the procedure should be compatible with the RADIUS protocol.

SUMMARY OF THE INVENTION

It is an object of the invention to address at least some of the problems and issues outlined above. It is possible to achieve these objects and others by using methods and authentication servers as defined in the attached independent claims.

A way of mitigating the problems indicated by using one pre-defined approver or many pre-defined approvers that may be contemplated is whether the authentication server can provide the user an option in the initial login prompt, i.e. when entering username and password, to indicate an approver ID, in addition to username and password. Hereby, the user could indicate one out of many pre-registered approvers to be used for the additional authentication process. However, the RADIUS protocol offers limited possibilities to transfer additional user information, beyond username and password, to the backend authentication server in the initial access request. Consequently, if the RADIUS protocol is to be used, another procedure has to be invented.

Instead, and according to embodiments, the additional authentication procedure is improved by, in response to the first authentication step, i.e. the authentication server authorizing the username and password entered by the user, the authentication server sends a request to the communication device to enter an approver ID of the approver that is to be used for the additional authentication procedure. Such a request can be sent as an extra, or additional, Access challenge according to the RADIUS challenge-response mechanism. In response to the request, the user enters on his/her communication device the approver ID of the approver that is to authorize the log-in this time, and the communication device sends the entered approver ID to the access server and further to the authentication server. The response may be sent to the authentication server as a Challenge Response according to the RADIUS challenge-response mechanism, the Challenge response then being a response to the extra Access challenge. The authentication server then checks if the approver of the received approver ID belongs to a group of authorized approvers or if the approver is listed in a pre-registered list of authorized approvers. The group or list of authorized approvers may be stored in a user repository to which the authentication server has access. If the approver ID belongs to a listed authorized approver, the authentication server sends to an approver device registered for the approver ID in e.g. the approver's account, an approval request whether the approver wants to approve access to the restricted data resource for the user of the communication device. Thereafter, the approver can respond as in the original additional authentication procedure, i.e. informing the authentication server that the approver approves access for the user, and the authentication server can grant the user access to the restricted data resource.

By such a method, a secure two-step authentication is achieved, and a plurality of different approvers can be used without jeopardizing the security. At the same time, the authentication procedure is still compatible with the standardized RADIUS protocol. Thereby, restricted data resources already using the RADIUS protocol can implement this method without having to make any changes in the restricted data resource. Also, the inventive two-step authentication procedure just comprises prompting one extra question to the user regarding approver ID and would consequently be easy to use for the user of the account.

Details of embodiments of the present invention will be described in the following claims and the detailed description.

BRIEF DESCRIPTION OF THE DRAWINGS

The solution will now be described in more detail by means of exemplary embodiments and with reference to the accompanying drawings, in which.

DETAILED DESCRIPTION OF THE EMBODIMENTS

Figure 1:
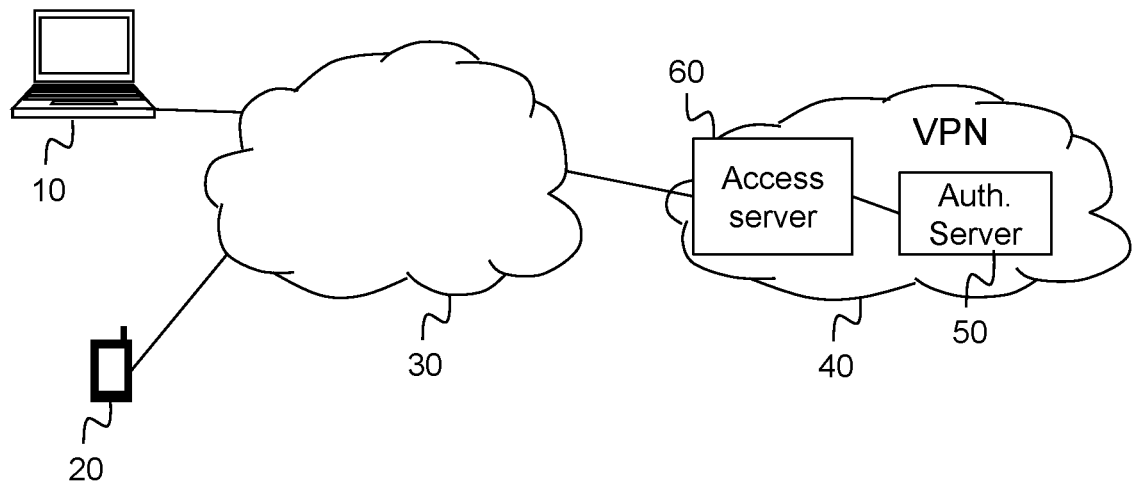
FIG. 1 is a block diagram of a communication scenario or architecture in which the present invention may be used.

FIG. 1 shows a communication scenario in which embodiments of the present invention may be used. A user of a communication device 10, here exemplified by a computer, would like to log-in to a restricted data resource 40, here exemplified by a VPN. The communication device 10 may be any wired or wireless communication device, for example a tablet or a mobile phone as well as a computer. The VPN 40 has an authentication server 50. The VPN 40 further comprises an access server 60 through which communication between outside of the VPN 40 and the authentication server 50 passes, e.g. communication between the communication device 10 and the authentication server 50. In other words, the access server 60 controls access to the VPN 40. The communication device 10 communicates with the access server 60 and the authentication server 50 via a regular communication network 30. Further, there is an approver that is connected to the regular communication network 30 via his/her communication device, called approver device 20. The approver device 20 is here exemplified by a mobile phone. The approver device 20 may be any other type of communication device able to communicate via the regular communication network 30, such as a computer, a tablet etc. The regular communication network 30 may be any wireline or wireless communication network or a combination of both.

Figure 2:
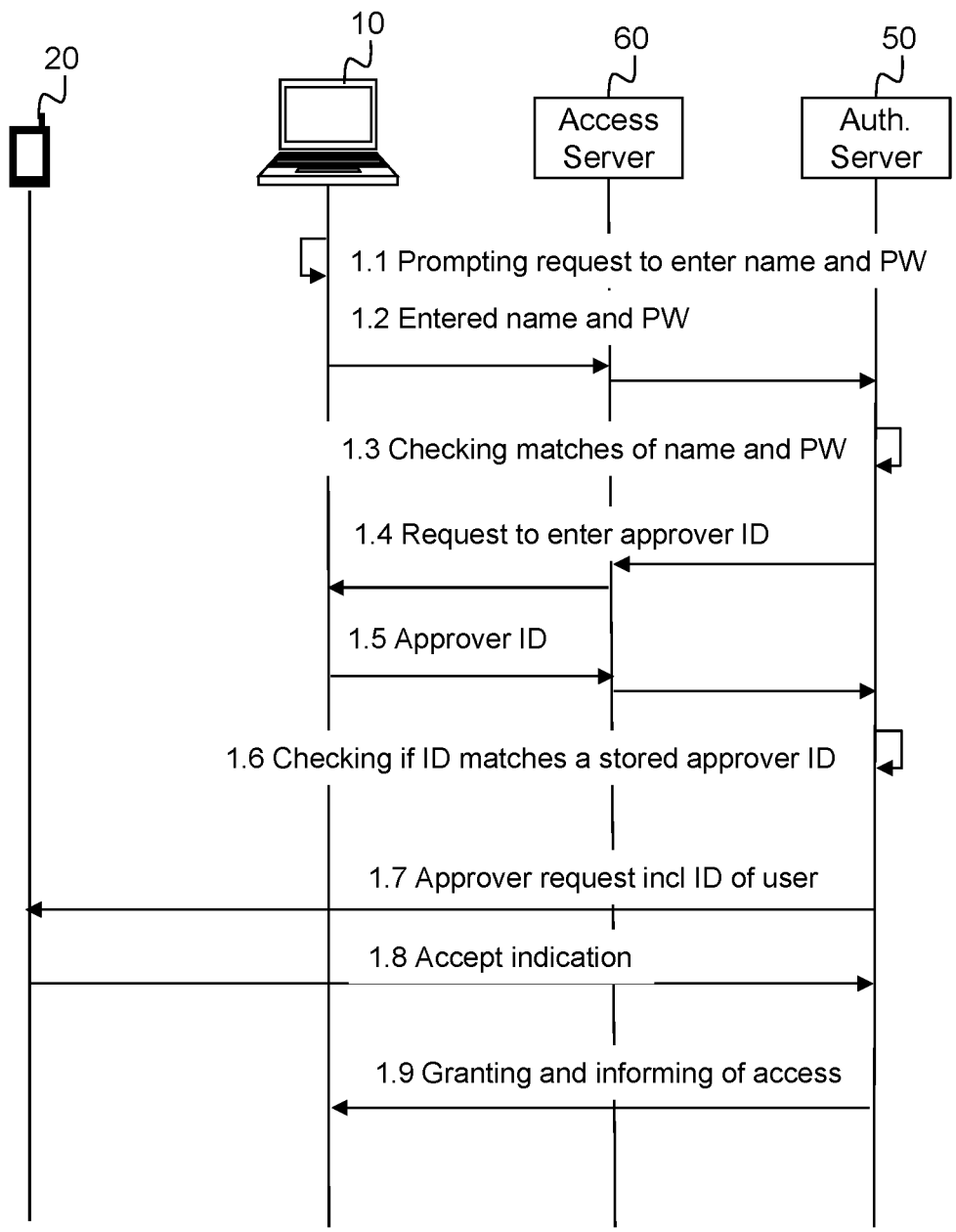
FIG. 2 is a signaling diagram illustrating a method according to possible embodiments of the invention.

FIG. 2 describes an embodiment of a method according to the invention for a system as in FIG. 1. When a user of the communication device 10, in FIG. 2 exemplified by a computer, reveals an interest to log-in to the restricted data resource 40, here exemplified by a VPN, the method starts by the computer 10, e.g. a VPN client on the computer, prompting 1.1 a request on the display of the computer 10, the request being a request to the user of the computer to enter a username and password. After the user has entered the username and password using an input unit of the computer 10, the computer sends 1.2 the entered username and password to the access server 60 of the VPN, which relays the entered user name and password to the authentication server 50. The communication between the access server 60 and the authentication server 50 is performed using the RADIUS communication protocol. The access server 60 performs any possible necessary adaptions of communication received from outside the restricted data resource 40 so that the communication from the restricted data resource is adapted to the RADIUS protocol. For example, the access server 60 performs any necessary translations between the RADIUS protocol and a communication protocol used outside the restricted data resource, i.e. a communication protocol used by the communication device 10, especially a client of the communication device 10.

The authentication server 50 then checks 1.3 whether the entered username matches any stored username, and if so, whether the entered password matches a password stored for the matching username. "Matching" means that the stored password is identical to the password entered by the user. When such a match of password is found for an identified username, the authentication server 50 sends a request 1.4 to the computer 10 via the access server 60 to enter an identification number (ID) of an approver that the user wants to approve his/her request to enter the VPN. After the user has entered the ID of the approver that the user wants to use, in this example the user of the mobile phone 20, in an input unit/user interface of the computer 10, the computer sends 1.5 the entered approver ID to the authentication server 50 via the access server 60. The authentication server 50 then checks 1.6 whether the approver ID it received from the communication device 10 matches any of a plurality of authorized approver IDs. In order to be an authorized approver, the approver has preferably previously been authorized by the restricted data resource, e.g. by a managing entity of the restricted data resource, to be an approver. The approver authorization may be indicated in a user account of the approver. When the authentication server 50 checks whether the approver ID it received from the communication device matches any of a plurality of authorized approver IDs, it may look for the approver ID in a user catalogue and see whether the approver ID has this indicated approver authorization. Also, according to an embodiment, the approver authorization may be connected to certain users, i.e. first it is checked that the approver ID is authorized to approve and then it is checked that the authorized approver has the right to approve this particular user.

When a match is found, i.e. when the approver ID has the approver authorization, and possibly also that the approver ID has the right to approve this certain user, the authentication server 50 sends 1.7 to an approver device 20 indicated by the approver ID, an approval request whether the approver wants to approve access to the restricted data resource 40 for the user of the communication device 10, This approval request comprises the ID of the user. The approver device 20 presents the approval request including user ID on its display for the approver to read/hear. When the approver finds the approval request OK, he/she inputs an accept to the request via a user interface of the approver device 20. When the approver device 20 receives input from the approver that the approval request is to be accepted, the approver device 20 sends an accept indication 1.8 to the authentication server 50. When the authentication server 50 receives the approval request, the authentication server 50 grants the user of the communication device 10 access to the restricted data resource 40. Information of granted access is sent 1.9 to the communication device 10. Information of granted access may also be sent to the approver device 20.

Figure 3:
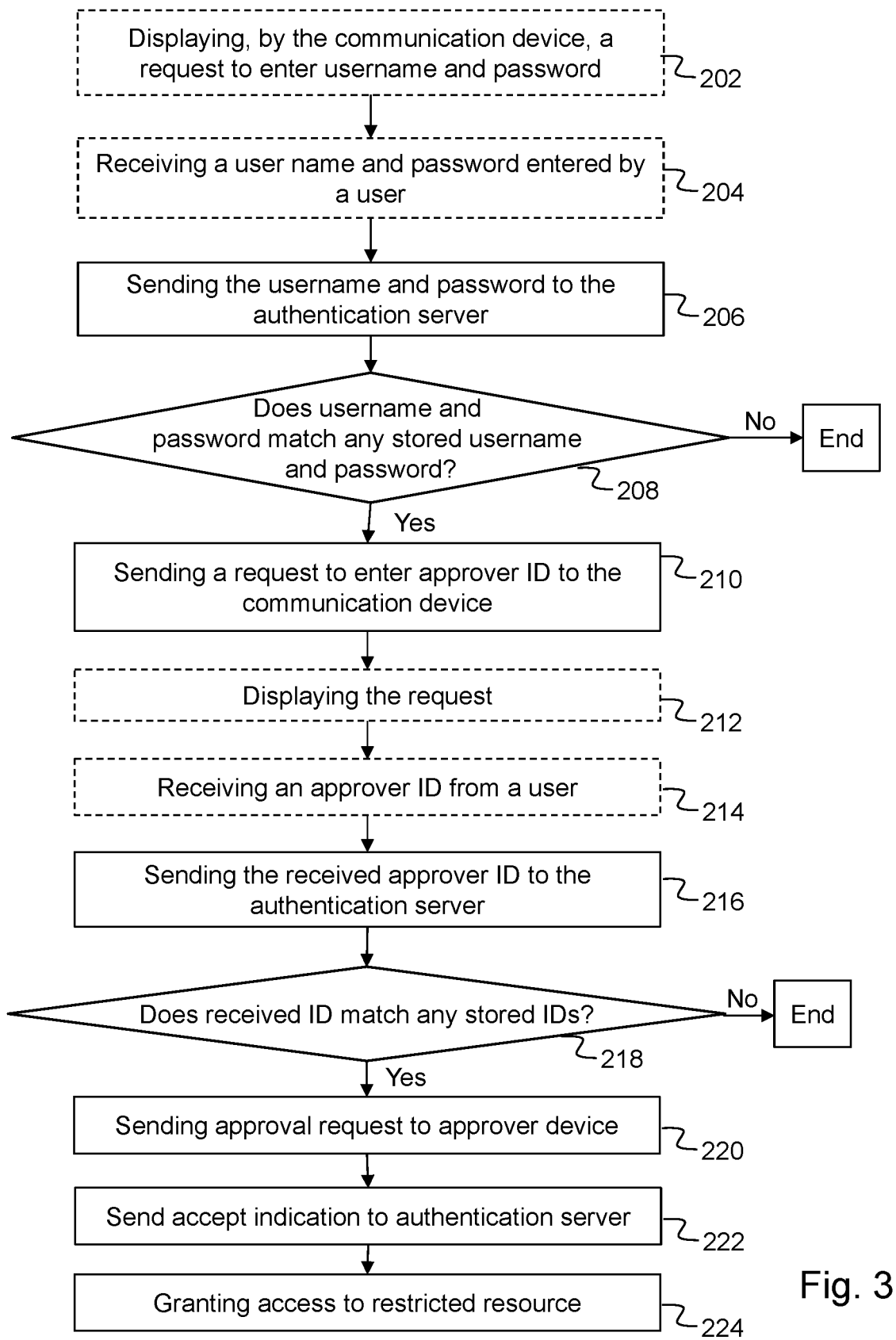
FIG. 3 is a flow chart illustrating a method performed by a system, according to possible embodiments.

FIG. 3, in conjunction with FIG. 1, shows a method performed by a system for authentication of users requesting access to a restricted data resource 40 from a communication device 10. The system comprises an authentication server 50 situated in the restricted data resource 40, an access server 60, the communication device 10, and an approver device 20. The method comprises sending 206, by the communication device 10 to the authentication server 50, a username and a password received from a user of the communication device in response to a request to enter a username and password for accessing the restricted data resource 40, and triggering checking 208, by the authentication server 50, whether the username received from the communication device matches a stored username of any account of the restricted data resource and whether the password received from the communication device matches a stored password for the account matching the username entered by the communication device. The method further comprises sending 210, by the authentication server 50 to the communication device 10 and when the password received from the communication device matches the stored password for the account matching the username received from the communication device, a request to enter an ID of an approver authorized to approve the user of the communication device 10 access to the restricted data resource 40, and sending 216, by the communication device 10 to the authentication server 50, an approver ID received from the user in response to the request to enter an approver ID. The method further comprises checking 218, by the authentication server 50, whether the approver ID received from the communication device matches any of a plurality of authorized approver IDs, and sending 220, by the authentication server 50 to the approver device 20 indicated by the approver ID received from the communication device, an approval request whether the approver wants to approve access to the restricted data resource 40 for the user of the communication device 10, the approval request comprising an ID of the user, when the approver ID received from the communication device matches any of the plurality of authorized approver IDs. The method further comprises sending 222, by the approver device 20 to the authentication server 50 and in response to the approver device receiving input that the approval request is to be accepted, an accept indication that the approver has accepted the approval request; and granting 224, by the authentication server 50 and in response to receiving the accept indication, the user of the communication device 10 access to the restricted data resource 40. Further, communication between the communication device 10 and the authentication server 50 passes via the access server 60, and the RADIUS protocol is used at least for the communication between the authentication server 50 and the access server 60.

By such a method it is possible for the authentication server 50 to ask the user of the communication device 10, which of a plurality of different approvers that the user would like to approve his/her request to access the restricted data resource. When receiving an approver ID in response, the authentication server can check that the approver indicated by the user of the communication device is an authorized approver and if so send an approval request to the approver device belonging to the approver ID. Hereby, a plurality of different approvers can be used without jeopardizing the security. At the same time, the authentication procedure is still compatible with the standardized RADIUS protocol. Also, only two extra messages are needed to be sent between the authentication server and the communication device which makes the method quite user friendly.

In the method described above, the restricted data resource may be e.g. a VPN or any digitally published content. The access server 60 provides access to the restricted data resource. Further, the access server performs any necessary translation between the RADIUS protocol and a communication protocol used between the access server and the communication device. The access server may be a gateway. The request to enter a username and password on the communication device is triggered by e.g. a client at the communication device prompting the user to enter username and password. The username and password are received from the user via a user input interface of the communication device. "Triggering checking" 208 signifies that either the authentication server itself checks whether the entered username and password matches any stored username and password, or alternatively the authentication server triggers another node of the restricted data resource having access to user data to perform this username and password check, such as a Lightweight Directory Access Protocol (LDAP) catalog e.g. an Active Directory. The approver is a different person than the user requesting access to the restricted data resource. The approver is a person that is authorized to approve accesses to the restricted data resource 40 for the account matching the entered username. The approver device 20 is a communication device. The approver device may or may not have a security mechanism installed that is able to check the identity of the person using the approver device, in order to guarantee that the identity of the person using the approver device is the actual approver. The approver ID may be a mobile phone number, a user-ID of an account of the approver, an employment ID or any other unique personal identifier. The approver device is connected to the approver ID so that the authentication server can find the correct approver device by using the approver ID. For example, an ID of the approver device may be registered in a user account of the approver, together with the approver ID. The input that the approval request is to be accepted is received by the approver device from the approver via a user interface on the approver device. Further, in the phrase "communication between the communication device 10 and the authentication server 50 passes via the access server 60, and the RADIUS protocol is used at least for the communication between the authentication server 50 and the access server 60", "communication" refers at least to steps 210 and 216.

According to an embodiment, the request to enter an approver ID is sent 210 by the authentication server as an Access challenge according to a challenge-response mechanism of the RADIUS protocol, and wherein the approver ID sent 216 by the communication device to the authentication server is received by the authentication server as a Challenge response to the Access Challenge, according to the RADIUS challenge-response mechanism. Since the Challenge-Response mechanism is a standardized part of the RADIUS protocol, it means the method can be implemented without requiring adaptations neither in the access server 60 nor in the communication device 10.

The approver ID is sent from the communication device 10 to the authentication server 50 in the response to the Access challenge. I.e. the Challenge response in 216 is a response to the Access challenge in 210. The RADIUS challenge-response mechanism is described in e.g. RFC 2865. Further, according to an embodiment, the RADIUS challenge-response mechanism work according to the following: An Access challenge comprises a prompt with a text string and a box, e.g. password attribute or field, where a response is to be inserted by the user. In the text string of the Access challenge, the user is prompted with the request to enter the ID of the approver the user wants to use. In the box, the user enters the approver ID, and the entered approver ID is sent as Challenge response to the authentication server 50.

According to another embodiment, the method further comprises sending, by the authentication server 50 to the approver device 20, information relating to a geographic position of the user of the communication device.

Hereby the approver is presented not only with information of the ID of the user but also of information of the user's position. In case access is only to be allowed when the user is in a certain geographic position, such as at his/her home computer, or in a certain country, the approver can decide whether to approve the user based on such grounds, thanks to the user position information. As an example, the information relating to a geographic position of the user may be found by checking the IP address for the communication device 10, checking geographical position information of the IP address and sending the geographical position information of the IP address to the approver device.

According to another embodiment, the method further comprises, checking, by the authentication server 50 whether the user registered for the communication device is authorized to access the restricted data resource via authentication of an approver, and only sending 210 the request to enter an ID of an approver to the communication device 10 when the user is authorized to access the restricted data resource via authentication of an approver. Here a check is made to see whether the user has the rights to use this way of accessing the restricted data resource, i.e. by using a third party approver, before the request to enter an approver ID is sent to the communication device of the user.

Further, in case any of the checking steps 208 or 218 would turn out negatively, i.e. if there would not be any match, the method may, as shown in FIG. 3, end, or alternatively the method may restart. However, it may also be possible that the user gets another try. For step 208, in case the entered username would not match any stored usernames, or the username would match a stored username but the entered password for the stored username would not match the stored password, the authentication server sends an access reject message to the access server 60, e.g. a RADIUS Access Reject. Then the access server 60 may either do nothing and the method ends, or the access server may send a new request to the communication device 10 to enter username and password. After a number of such tries have not succeeded, the communication device may be banned from entering the restricted data resource 40. For step 218, in case the approver ID entered by the user would not match any authorized approver IDs, the authentication server 50 may send 210 a new request to enter approver ID to the communication device 10, via the access server 60, or the authentication process may be aborted.

According to an alternative, the method of FIG. 3 may also comprise displaying 202 by a display unit of the communication device 10, the request to enter a username and a first password, and receiving 204, in response to the displaying 202 and at an input unit of the communication device 10, a username and a password from a user. The password and username are then sent 206 to the authentication server, as described earlier in relation to FIG. 3.

According to another alternative, the method of FIG. 3 may also comprise displaying 212, by the display unit of the communication device 10, the request to enter an approver ID, and receiving 214 from the user, at the input unit of the communication device 10 and in response to the displayed request, the approver ID entered by the user. The approver ID received from the user is then sent 216 to the authentication server, as described earlier in relation to FIG. 3.

Figure 4:
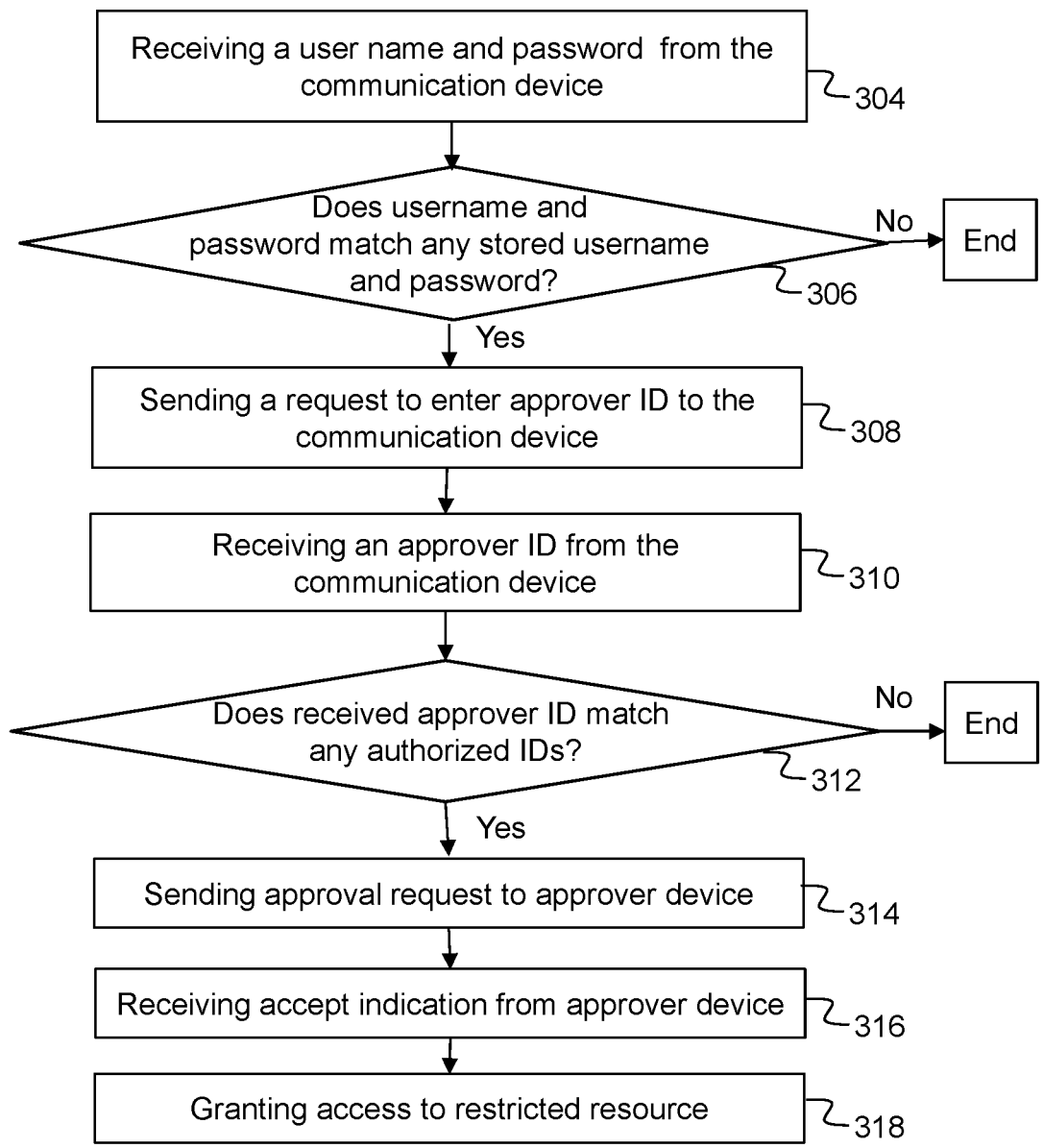
FIG. 4 is a flow chart illustrating a method performed by an authentication server, according to possible embodiments.

FIG. 4, in conjunction with FIG. 1, shows a method performed by an authentication server 50 for authentication of users requesting access to a restricted data resource 40 from a communication device 10, the authentication server 50 being situated in the restricted data resource 40. The method comprises receiving 304 from the communication device 10, a username and a password received from a user of the communication device in response to a request to enter a username and password for accessing the restricted data resource 40, and triggering checking 306 whether the username received from the communication device matches a stored username of any account of the restricted data resource and whether the password received from the communication device matches a stored password for the account matching the username received from the communication device. The method further comprises sending 308, to the communication device 10 and when the password received from the communication device matches the stored password for the account matching the username received from the communication device, a request to enter an ID of an approver authorized to approve the user of the communication device 10 access to the restricted data resource 40, and receiving 310, from the communication device 10, an approver ID received from the user in response to the request to enter an approver ID. The method further comprises checking 312 whether the approver ID received from the communication device matches any of a plurality of authorized approver IDs, and sending 314, to an approver device 20 indicated by the approver ID received from the communication device, an approval request whether the approver wants to approve access to the restricted data resource 40 for the user of the communication device 10, the approval request comprising an ID of the user, when the approver ID received from the communication device 10 matches any of the plurality of authorized approver IDs. The method further comprises receiving 316, from the approver device 20 and in response to the approver device receiving input that the approval request is to be accepted, an accept indication that the approver has accepted the approval request; and granting 318, in response to receiving the accept indication, the user of the communication device 10 access to the restricted data resource 40. Further, communication between the communication device 10 and the authentication server 50 50 passes via the access server 60, and the RADIUS protocol is used at least for the communication between the authentication server 50 and the access server 60.

The restricted data resource may be e.g. a VPN or any digitally published content. The request to enter a username and password on the communication device is triggered by e.g. a client at the communication device prompting the user to enter username and password. The username and password are received from the user via a user input interface of the communication device. "Triggering checking" 306 signifies that either the authentication server itself checks whether the entered username and password matches any stored username and password, or alternatively the authentication server triggers another node of the restricted data resource having access to user data to perform this username and password check, such as a Lightweight Directory Access Protocol (LDAP) catalog e.g. an Active Directory. The approver is a different person than the user requesting access to the restricted data resource. The approver is a person that is authorized to approve accesses to the restricted data resource 40 for the account matching the entered username. The approver device 20 is a communication device. The approver ID may be a mobile phone number, a user-ID of an account of the approver, an employment ID or any other unique personal identifier. The approver device is connected to the approver ID so that the authentication server can find the correct approver device by using the approver ID. For example, an ID of the approver device may be registered in a user account of the approver, together with the approver ID. The input that the approval request is to be accepted is received by the approver device from the approver via a user interface on the approver device. Further, "communication" in "communication between the communication device 10 and the authentication server 50 passes via the access server" refers at least to steps 308 and 310 above.

According to an embodiment, the request to enter an approver ID is sent 308 as an Access challenge according to a challenge-response mechanism of the RADIUS protocol. Further, the approver ID is received 310 from the communication device as a Challenge response to the Access Challenge, according to the RADIUS challenge-response mechanism.

According to another embodiment, the method further comprises sending, to the approver device 20, information relating to a geographic position of the user of the communication device.

According to another embodiment, the method further comprises checking whether the user registered for the communication device is authorized to access the restricted data resource via authentication of an approver, and only sending 308 the request to enter an ID of an approver to the communication device 10 when the user is authorized to access the restricted data resource via authentication of an approver.

Figure 5:
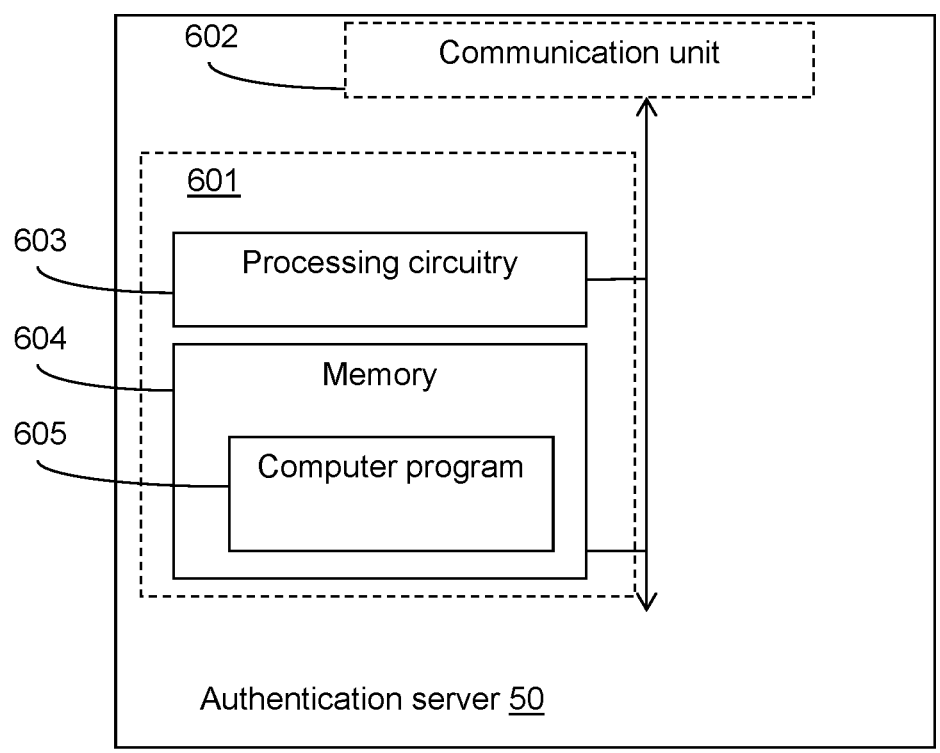
FIG. 5 is a block diagram illustrating an authentication server of FIG. 1 in more detail, according to further possible embodiments.

FIG. 5, in conjunction with FIG. 1, illustrates an authentication server 50 configured for authentication of users requesting access to a restricted data resource 40 from a communication device 10. The authentication server 50 is situated in the restricted data resource 40. The authentication server 50 comprises a processing circuitry 603 and a memory 604. Said memory 604 contains instructions executable by said processing circuitry 603, whereby the authentication server 50 is operative for receiving from the communication device 10, a username and a password received from a user of the communication device in response to a request to enter a username and password for accessing the restricted data resource 40 and triggering checking whether the username received from the communication device matches a stored username of any account of the restricted data resource and whether the password received from the communication device matches a stored password for the account matching the username received from the communication device. The authentication server 50 is further operative for sending, to the communication device 10 and when the password received from the communication device matches the stored password for the account matching the username received from the communication device, a request to enter an ID of an approver authorized to approve the user of the communication device 10 access to the restricted data resource 40, and receiving, from the communication device 10, an approver ID received from the user in response to the request to enter an approver ID. The authentication server 50 is further operative for checking whether the approver ID received from the communication device matches any of a plurality of authorized approver IDs, and sending, to an approver device 20 indicated by the approver ID received from the communication device, an approval request whether the approver wants to approve access to the restricted data resource 40 for the user of the communication device 10, the approval request comprising an ID of the user, when the approver ID received from the communication device matches any of the plurality of authorized approver IDs. The authentication server 50 is further operative for receiving, from the approver device 20 and in response to the approver device receiving input that the approval request is to be accepted, an accept indication that the approver has accepted the approval request; and granting, in response to receiving the accept indication, the user of the communication device 10 access to the restricted data resource 40. Further, the authentication server is arranged so that communication between the communication device 10 and the authentication server 50 passes via the access server 60. Further, the authentication server is arranged to use the RADIUS protocol at least for the communication between the authentication server 50 and the access server 60.

According to an embodiment, the authentication server 50 is operative for sending the request to enter an approver ID as an Access challenge according to a challenge-response mechanism of the RADIUS protocol, and for receiving the approver ID from the communication device as a Challenge response to the Access Challenge, according to the RADIUS challenge-response mechanism.

According to another embodiment, the authentication server 50 is operative for sending, to the approver device 20, information relating to a geographic position of the user of the communication device.

According to another embodiment, the authentication server 50 is operative for checking whether the user registered for the communication device is authorized to access the restricted data resource via authentication of an approver, and only sending the request to enter an ID of an approver to the communication device 10 when the user is authorized to access the restricted data resource via authentication of an approver.

According to other embodiments, the authentication server 50 may further comprise a communication unit 602, which may be considered to comprise conventional means for communication with the access server 60 and further to nodes and devices outside the restricted data resource, such as the communication device 10 and the approver device 20 via the access server 60 and the communication network 30. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry 603, they cause the authentication server 50 to perform the steps described in any of the described embodiments of the authentication server 50 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

What is claimed is:

1. A method performed by a system for authentication of users requesting access to a restricted data resource from a communication device, the system comprising an authentication server situated in the restricted data resource, an access server, the communication device, and an approver device, the method comprising:

sending, by the communication device to the authentication server, a username and a password received from a user of the communication device in response to a request to enter a username and password for accessing the restricted data resource;

triggering checking, by the authentication server, whether the username received from the communication device matches a stored username of any account of the restricted data resource and whether the password received from the communication device matches a stored password for the account matching the username entered by the communication device, sending, by the authentication server to the communication device and when the password received from the communication device matches the stored password for the account matching the username received from the communication device, a request to enter an approver ID corresponding to an approver authorized to approve the user of the communication device access to the restricted data resource, sending, by the communication device to the authentication server, an approver ID received from the user in response to the request to enter an approver ID;

checking, by the authentication server, whether the approver ID received from the communication device matches any of a plurality of authorized approver IDs, each of the plurality of authorized approver IDs being associated with the approver device and a corresponding approver, and the approver being a user of an approver device different from the user of the communication device;

sending, by the authentication server to the approver device associated with the approver ID received from the communication device, an approval request whether the approver wants to approve access to the restricted data resource for the user of the communication device, the approval request comprising an ID of the user, when the approver ID received from the communication device matches any of the plurality of authorized approver IDs;

sending, by the approver device to the authentication server and in response to the approver device receiving input from the approver that the approval request is to be accepted, an accept indication that the approver has accepted the approval request; and granting, by the authentication server and in response to receiving the accept indication, the user of the communication device access to the restricted data resource, wherein communication between the communication device and the authentication server passes via the access server, wherein the Remote Authentication Dial-In User Services (RADIUS) protocol is used at least for the communication between the authentication server and the access server, and wherein the user does not have access to the approver device.

2. The method according to claim 1, wherein the request to enter an approver ID is sent by the authentication server as an Access challenge according to a challenge-response mechanism of the RADIUS protocol, and wherein the approver ID sent by the communication device to the authentication server is received by the authentication server as a Challenge response to the Access Challenge, according to the RADIUS challenge-response mechanism.

3. The method according to claim 1, further comprises sending, by the authentication server to the approver device, information relating to a geographic position of the user of the communication device.

4. The method according to claim 1, further comprising, checking, by the authentication server whether the user registered for the communication device is authorized to access the restricted data resource via authentication of an approver, and only sending the request to enter an approver ID to the communication device when the user is authorized to access the restricted data resource via authentication of an approver.

5. A method performed by an authentication server for authentication of users requesting access to a restricted data resource from a communication device, the authentication server being situated in the restricted data resource, the method comprising:

receiving from the communication device, a username and a password received from a user of the communication device in response to a request to enter a username and password for accessing the restricted data resource;

triggering checking whether the username received from the communication device matches a stored username of any account of the restricted data resource and whether the password received from the communication device matches a stored password for the account matching the username received from the communication device;

sending, to the communication device and when the password received from the communication device matches the stored password for the account matching the username received from the communication device, a request to enter an approver ID corresponding to an approver authorized to approve the user of the communication device access to the restricted data resource;

receiving, from the communication device, an approver ID received from the user in response to the request to enter an approver ID;

checking whether the approver ID received from the communication device matches any of a plurality of authorized approver IDs, each of the plurality of authorized approver IDs being associated with an approver device and a corresponding approver, and the approver being a user associated with an approver device different from the user of the communication device;

sending, to an approver device associated with the approver ID received from the communication device, an approval request whether the approver wants to approve access to the restricted data resource for the user of the communication device, the approval request comprising an ID of the user, when the approver ID received from the communication device matches any of the plurality of authorized approver IDs;

receiving, from the approver device and in response to the approver device receiving input from the approver that the approval request is to be accepted, an accept indication that the approver has accepted the approval request; and granting, in response to receiving the accept indication, the user of the communication device access to the restricted data resource, wherein communication between the communication device and the authentication server passes via the access server, and the Remote Authentication Dial-In User Services (RADIUS) protocol is used at least for the communication between the authentication server and the access server, and wherein the user does not have access to the approver device.

6. The method according to claim 5, wherein the request to enter an approver ID is sent as an Access challenge according to a challenge-response mechanism of the RADIUS protocol, and wherein the approver ID is received from the communication device as a Challenge response to the Access Challenge, according to the RADIUS challenge-response mechanism.

7. The method according to claim 5, further comprises sending, to the approver device, information relating to a geographic position of the user of the communication device.

8. The method according to claim 5, further comprising, checking whether the user registered for the communication device is authorized to access the restricted data resource via authentication of an approver, and only sending the request to enter an approver ID to the communication device when the user is authorized to access the restricted data resource via authentication of an approver.

9. An authentication server configured for authentication of users requesting access to a restricted data resource from a communication device, the authentication server being situated in the restricted data resource, the authentication server comprising a processing circuitry and a memory, said memory containing instructions executable by said processing circuitry, whereby the authentication server is operative for:

receiving from the communication device, a username and a password received from a user of the communication device in response to a request to enter a username and password for accessing the restricted data resource;

triggering checking whether the username received from the communication device matches a stored username of any account of the restricted data resource and whether the password received from the communication device matches a stored password for the account matching the username received from the communication device;

sending, to the communication device and when the password received from the communication device matches the stored password for the account matching the username received from the communication device, a request to enter an approver ID corresponding to an approver authorized to approve the user of the communication device access to the restricted data resource;

receiving, from the communication device, an approver ID received from the user in response to the request to enter an approver ID;

checking whether the approver ID received from the communication device matches any of a plurality of authorized approver IDs, each of the plurality of authorized approver IDs being associated with an approver device and a corresponding approver, and the approver being a user of an approver device different from the user of the communication device;

sending, to an approver device associated with the approver ID received from the communication device, an approval request whether the approver wants to approve access to the restricted data resource for the user of the communication device, the approval request comprising an ID of the user, when the approver ID received from the communication device matches any of the plurality of authorized approver IDs;

receiving, from the approver device and in response to the approver device receiving input that the approval request is to be accepted, an accept indication that the approver has accepted the approval request; and granting, in response to receiving the accept indication, the user of the communication device access to the restricted data resource, wherein communication between the communication device and the authentication server passes via the access server, and the Remote Authentication Dial-In User Services (RADIUS) protocol is used at least for the communication between the authentication server and the access server, and wherein the user does not have access to the approver device.

10. The authentication server according to claim 9, operative for sending the request to enter an approver ID as an Access challenge according to a challenge-response mechanism of the RADIUS protocol, and for receiving the approver ID from the communication device as a Challenge response to the Access Challenge, according to the RADIUS challenge-response mechanism.

11. The authentication server according to claim 9, further being operative for sending, to the approver device, information relating to a geographic position of the user of the communication device.

12. The authentication server according to claim 9, further being operative for, checking whether the user registered for the communication device is authorized to access the restricted data resource via authentication of an approver, and only sending the request to enter an approver ID to the communication device when the user is authorized to access the restricted data resource via authentication of an approver.

13. The method according to claim 1, wherein the approver device is separate from the communication device.

14. The method according to claim 5, wherein the approver device is separate from the communication device.

15. The authentication server according to claim 9, wherein the approver device is separate from the communication device.

16. The method according to claim 1, wherein the approver device is a communication device and the approver device comprises a security mechanism to verify the identity of the approver using the approver device to verify that the approver is authorized to approve the user of the communication device access to the restricted data resource.

17. The method according to claim 5, wherein the approver device is a communication device and the approver device comprises a security mechanism to verify the identity of the approver using the approver device to verify that the approver is authorized to approve the user of the communication device access to the restricted data resource.

18. The authentication server according to claim 9, wherein the approver device is a communication device and the approver device comprises a security mechanism to verify the identity of the approver using the approver device to verify that the approver is authorized to approve the user of the communication device access to the restricted data resource.

* * * * *